(No Model.)

C. H. MYERS.
OSCILLATING GRAIN METER.

No. 505,840.  Patented Oct. 3, 1893.

Witnesses
J. F. Coleman
F. W. Keiner

Inventor
Chas. H. Myers
by S. C. Fitzgerald
Attorney

UNITED STATES PATENT OFFICE.

CHARLES HENRY MYERS, OF LEROY, ILLINOIS.

OSCILLATING GRAIN-METER.

SPECIFICATION forming part of Letters Patent No. 505,840, dated October 3, 1893.

Application filed February 8, 1893. Serial No. 461,420. (No model.)

*To all whom it may concern:*

Be it known that I, CHARLES HENRY MYERS, a citizen of the United States, residing at Leroy, in the county of McLean, State of Illinois, have invented certain new and useful Improvements in Grain Measuring and Sacking Devices; and I do hereby declare the following to be a full, clear, and exact description of the invention, such as will enable others skilled in the art to which it appertains to make and use the same.

My invention relates to an improved grain measuring and sacking device for thrashing machines and the like.

The invention will first be described in connection with the accompanying drawings, and then pointed out in the claims.

Figure 1:
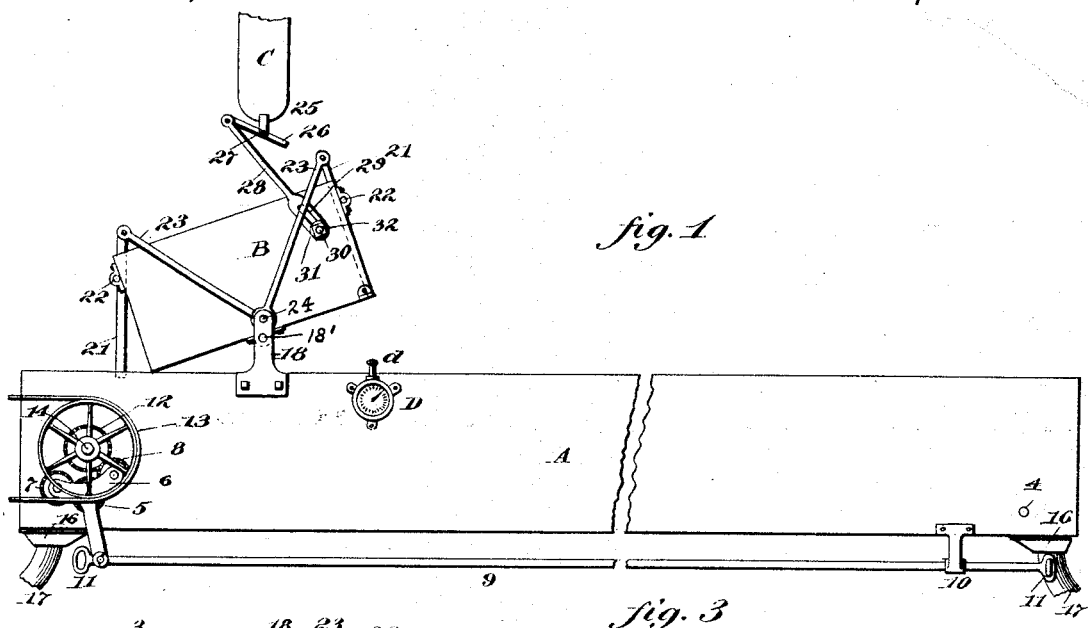
Figure 3:
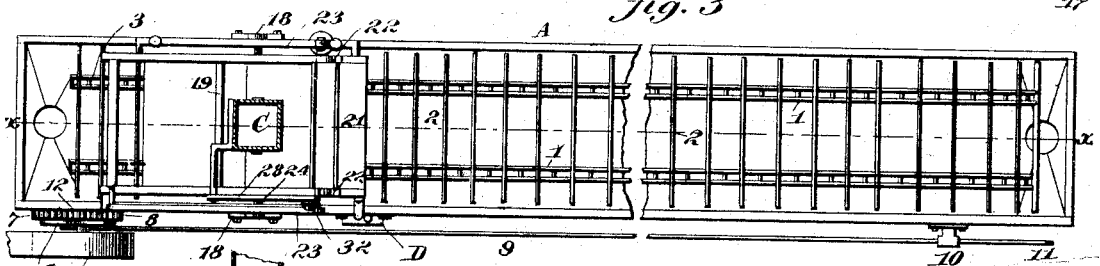
Figure 4:
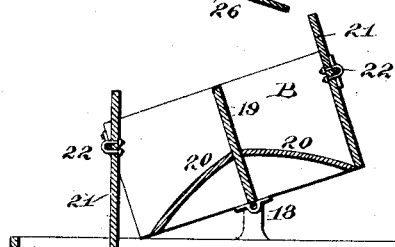
Figure 4:
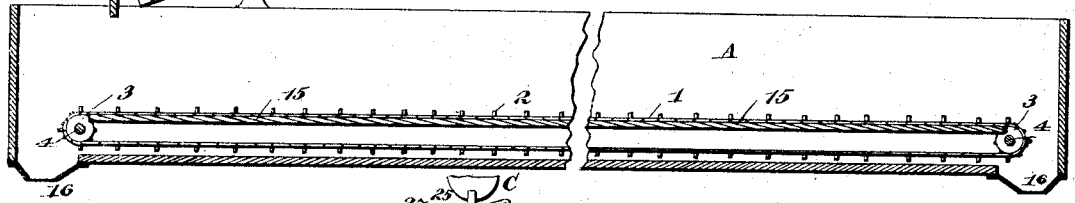
Figure 2:
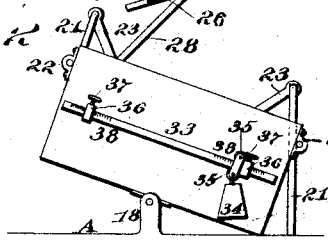

In the drawings, Figure 1 is a side elevation of my improved apparatus. Fig. 2 is a side elevation of the tilting-box, showing the side opposite to that seen in Fig. 1. Fig. 3 is a plan view of Fig. 1. Fig. 4 is a longitudinal vertical section taken on the line $x$—$x$, Fig. 3.

Referring to the drawings, A is a grain box having endless chains 1 provided with strap-iron cleats 2, and passing over rollers 3, mounted on shafts 4, journaled at each end of the box, one of the roller-shafts 4 being extended some distance outside of the box and provided with a cog wheel 5, outside of which is loosely mounted a three armed gear-hanger 6, on two arms of which are journaled a pair of gear-wheels 7 and 8 in mesh with the gear-wheel 5. The third arm of the gear-hanger is provided with a shifting-rod 9 supported from a hanger 10 secured to the side of the box, the shifting-rod being provided with a suitable handle 11 at each end.

Just above the cog wheel 5 and in the same vertical plane is a gear-wheel 12 made integral with a band-wheel 13, both the band-wheel and the gear-wheel 12 being loosely mounted on a shaft 14 secured to the side of the box. It is apparent that by throwing the gear-hanger 6 so as to mesh the gear-wheel 7 with the gear-wheel 12, the roller-shaft 4 will be revolved in one direction through the medium of gear-wheel 5, thus driving the endless chains 1 in a corresponding direction, while if the gear-hanger 6 is swung so as to mesh the gear-wheel 8 with gear-wheel 12 the direction of the travel of the chains will be reversed.

Just beneath the upper section of chains 1 is fixed a false bottom 15 fixed to the inside of the box A and adapted to serve as a floor along which the grain is scraped by the chains and cleats.

Each end of box A is provided with a spout-nipple 16 on which is secured a grain-spout 17 in any suitable manner.

To the side of a box A, near one end, are fixed a pair of uprights 18, to which is pivoted at 18' a tilting-box B as shown, the tilting-box having a central partition 19, whose upper edge is rounded off, and provided with a bottom 20 rounded each way from the central partition. The ends 21 of the tilting-box are pivoted at 22 a short distance below their upper ends as will be fully understood from the drawings. The tops of the swinging ends are extended above the top of the box B, a link 23 being pivoted to the projecting tops of each swinging end 21, both links being also pivoted to a stud 24 projecting inward from one of the uprights 18.

Above the center of the tilting-box when in a horizontal position is the grain spout C, which delivers the grain from the thrashing machine in the usual way, the lower end of the spout being rounded as shown at 25 and provided with a swinging bottom or cut-off 26, fixed on a shaft 27, which is journaled in the rounded end of the spout.

Secured to one end of the cut-off 26 is a cut-off arm 28, slotted at 29 and engaging a stud 30 secured to one side of the tilting-box B near its end a washer 31 and nut 32 holding the cut-off arm in place on the stud.

On the opposite side of the tilting-box B from that on which the links 23 are pivoted is secured a bent weight-rod 33, parallel to the length of the box. On this rod a weight 34 is adapted to move easily by means of rollers 35.

To adjustably limit the movement of the weight 34, stops 36 are mounted on the rod, one at each end, and adjustable along the rod by means of thumb screws 37, the rod being graduated at each end, as shown at 38, to indicate the position of the stops.

The operation of my apparatus is as follows: The grain flows through the grain-spout C and strikes the swinging bottom or cut-off 26 which deflects it into that half of the tilting-box which is uppermost, it being understood that the weight 34 is at the lowest end of the rod 33, which is its normal position. When the uppermost half of the tilting-box is filled with grain the weight of that end is sufficient to overbalance the weight at the other end and the box tilts, the link 23 attached to the swinging end at the loaded portion of the box pulling the said end open and allowing the grain to fall in the grain-box A beneath where it is carried to either end, as desired, by the endless apron 1 actuated by the band-wheel 13 which is driven by a belt from the thrashing machine. As soon as that end of the box B which is loaded with grain overbalances and tilts down, the weight 34 is raised and runs by gravity to the lower end of the weight-rod 33, thereby tending to hold that end down until the grain which is now flowing into the uppermost portion of the box B is heavy enough to tilt the box again when the operation is completed as before. As the box tilts, the door at the end which is then rising, is closed by the action of its link, 23, which compels the end, 21, extending above the box to describe the arc of a circle, for the reason that, the links being pivoted at 24 and the box at 18', the distance from the point 24 to the upper corners of the box is greater at the higher end than at the lower end. When the box tilts, the cut-off or swinging-bottom 26 is turned or dumped by the arm 28, actuated by the stud 30 on the box B, as will be fully understood from the drawings.

It is apparent that the amount of grain necessary to tilt the box B may be regulated by adjusting the leverage of the weight 34 by the stops 36 and thumb-screws 37, the graduations 38 being such as indicate, say, bushels, and half-bushels.

To keep an account mechanically of the number of times the box B tilts, a tally device of any suitable kind as shown at D may be used, the said tally being secured to the grain-box A in such a manner that the tilting-box B will strike its registering stud $d$ and mark up the number of tilts made by the box; if for instance, each end of the tilting-box was set to hold one-half bushel, and the tally device showed one hundred tilts, it is plain that one hundred bushels had passed through the measuring device, for the tally device only registers the tilts in one direction, the full number of tilts being therefore twice that shown on the tally dial.

Having thus fully described my invention, what I claim as new, and desire to secure by Letters Patent, is—

1. In a grain-measurer, the combination, with a pair of uprights, a tilting-box pivoted in the uprights and having open ends, a partition located in the center of the box, and a swinging gate for each end of the box, each gate projecting above its pivoted point, of a link for each gate, each link pivoted at one end to the projecting top of its respective swinging-gate and pivoted at the other end to one of the uprights, substantially as described and for the purpose set forth.

2. In a grain-measurer, the combination with a tilting-box having a central partition and open ends, of a grain-spout located above the box, a swinging deflector pivoted to the bottom of the grain-spout, an arm secured to the swinging deflector and provided with a slot in its lower end, a stud device passing through the slot in said arm and secured to the box, a weight rod secured to one side of the box, and a weight arranged to run on the weight-rod, substantially as described.

In testimony whereof I affix my signature in presence of two witnesses.

CHARLES HENRY MYERS.

Witnesses:
 H. C. MYERS,
 C. T. KARR.